May 30, 1967  R. H. BAUMAN  3,322,238

BRAKE SHOE CENTERING DEVICE

Filed Oct. 12, 1964

INVENTOR.
ROBERT H. BAUMAN
BY
Donald P. Schwerki
ATTORNEY

3,322,238
BRAKE SHOE CENTERING DEVICE
Robert H. Bauman, Dayton, Ohio, assignor to General Motors Corporation, Detroit, Mich., a corporation of Delaware
Filed Oct. 12, 1964, Ser. No. 403,034
6 Claims. (Cl. 188—79.5)

This invention relates to vehicle brakes and more particularly to a device utilized for centering a brake shoe and maintaining a preset clearance of the brake shoe from the brake drum during lining wear.

It is an object of the present invention to provide an improved brake shoe centering device.

It is another object of the present invention to provide an improved device for maintaining a preset clearance between a brake shoe and a brake drum.

Further objects and advantages of the present invention will be apparent from the following description, reference being had to the accompanying drawings wherein a preferred embodiment of the present invention is clearly shown.

Figure 1:
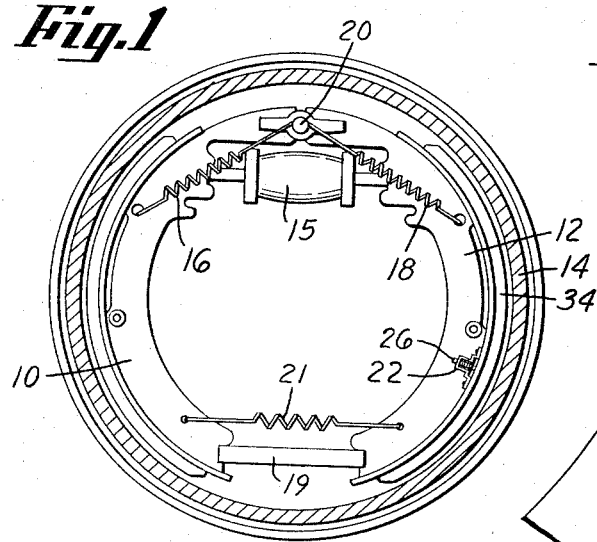
FIGURE 1 is an elevational view of a typical vehicle wheel brake.

Referring now to FIGURE 1, a brake shoe 10 and brake shoe 12 are shown in close proximity to a brake drum 14. The shoes 10 and 12 are drivable into engagement with the drum 14 by hydraulic pressure build-up in a wheel cylinder 15 which causes the shoes 10 and 12 to separate in the conventional manner. Return springs 16 and 18 serve to draw the shoes 10 and 12 toward an anchor pin 20 after a brake actuation. A shoe adjuster 19 disposed between ends of the brake shoes 10 and 12 and held in position by spring 21 establishes a clearance for the shoes 10 and 12 from the drum 14.

Figure 2:
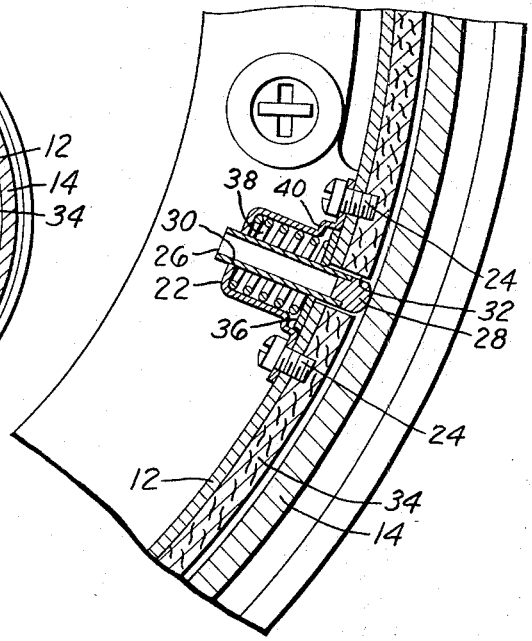
FIGURE 2 is a sectional view of the subject invention illustrated in the position it would assume when the brake shoe is disposed a preset distance from the brake drum.

Referring now to FIGURE 2, a bracket 22 is mounted to the brake shoe 12 and secured thereto by mounting screws 24. A pin 26, having an end 28 composed of any well-known friction resistant material, such as powdered metal, is slidable through an aperture 30 in the bracket 22 and in an aperture 32 in the brake shoe 12. It is seen in FIGURE 2 that the pin 26 extends through a lining 34 carried by the brake shoe 12 so that the end 28 maintains contact with the drum 14. A washer or flange 36 is carried by the pin 26 and frictionally engages the periphery thereof. A spring 38 is contained under compression between an end of the bracket 22 and the washer 36. It should be noted that the frictional engagement of the washer 36 with the pin 26 is strong enough to resist the compression of the spring 38. The washer 36 is able to move between an outwardly extending flange portion 40 of the bracket 22 and the surface of the brake shoe 12. The space in which the washer 36 relatively moves is equal to the amount of clearance desired between the brake lining 34 and the drum 14.

Figure 3:
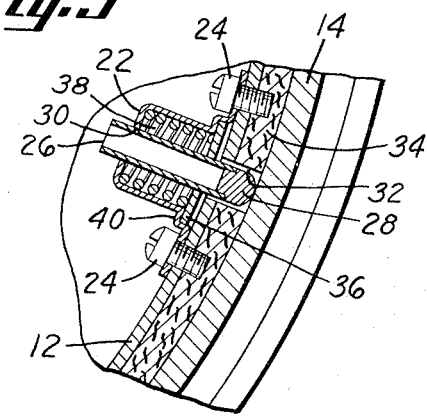
FIGURE 3 is a sectional view of the subject invention, the invention shown in the position it would assume during a brake actuation.
Figure 4:
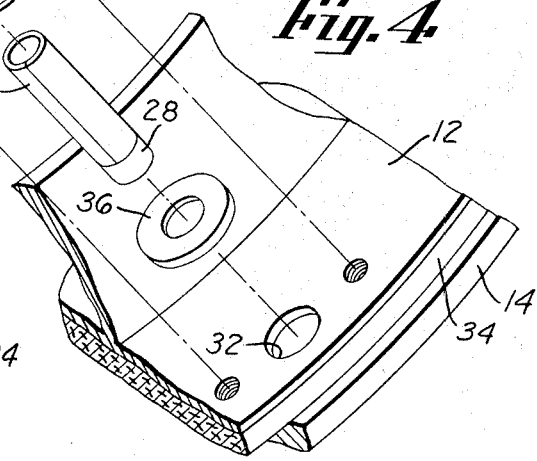
FIGURE 4 is an exploded view of the subject invention.

In operation and referring to FIGURE 3, it will be assumed that the vehicle brake has been actuated and brake lining 34 is driven into engagement with the drum 14. Under these conditions, the end 28 of the pin 26 maintains its position against the drum 14, and the flange portion 40 is moved until it bottoms on the washer 36. It should be noted that the brake energizing force is greater than the peripheral engagement of the washer 36 with the pin 26. Therefore, if the distance the brake lining 34 moves to engage the drum 14 is greater than the distance between the flange 40 and the surface of the brake shoe 12, the washer 36 will be repositioned on the periphery of the pin 26. Therefore, a new relationship between the end 28 of the pin 26 and the flange 40 will be set up.

Referring to FIGURE 2, as the pressure is released from the master cylinder 15, the return springs 16 and 18 will bias the shoes 10 and 12 toward the anchor pin 20. If a drag exists against the brake shoes 10 and 12 tending to resist the force of the springs 16 and 18, the spring 38 will assist the return springs 16 and 18 by driving the bracket 22 away from the washer 36 as then positioned. The bracket 22, being carried by the brake shoe 12, thereby pulls the brake shoe 12 away from the drum 14 a distance equal to the spacing of the flange 40 from the brake shoe 12.

The utility of the present invention is obvious in the environment of a vehicle braking system. The end 28 of the pin 26 constantly rides on the drum 14 and the biasing force of the spring 38 will always position the bracket 22 relative to the washer 36. As the brake lining 34 wears, a greater clearance will develop between the lining 34 and the drum 14. Therefore, the flange 40 mounted in fixed relationship with respect to the brake shoe 12 will reposition the flange 36 on the pin 26 to establish a new distance in which the brake shoe 12 can be positioned after brake actuation. The frictional material forming the end 28 of the pin 26 has at least the same wear characteristics of the brake lining 34 and, therefore, operates throughout the life of the lining 34 to maintain the preset clearance between the lower end of the shoe 12 and the drum 14. The present invention is useful in the aforementioned environment because of the propensity of brake shoes of the type described to pivot about the anchor pin 20 even against the compression of the springs 16 and 18.

The mounting of the invention on the rear brake shoe 12 is desirable because of the normal movement of the shoe 12 toward the drum 14 in a pivoting manner around the anchor pin 20 as the brakes are applied to a forward moving vehicle. Brakes are applied more often to a forward moving vehicle and, therefore, the need for the subject device would be greater when used in connection with the rear or secondary brake shoe 12. However, it is obvious that the subject invention might also be mounted on the front or primary brake shoe 10 in order to maintain a preset clearance from the drum 14.

While the embodiment of the present invention, as herein disclosed, constitutes a preferred form, it is to be understood that other forms might be adopted.

What is claimed is as follows:

1. A device for maintaining a preset clearance between opposed surfaces, said device comprising: first and second opposed surfaces, at least one of which moves relative to the other; friction means carried by a first of said opposed surfaces and having a portion maintaining contact with a second opposed surface; biasing means carried by said first opposed surface and arranged to urge said friction means toward said second opposed surface; and means carried by said friction means for limiting an urging motion induced in said friction means by said biasing means.

2. A device for maintaining a preset clearance between two opposed surfaces, said device comprising: first and second opposed surfaces, at least the first of said surfaces adapted to move relative to the second opposed surface; friction means carried by the first surface and having a portion in contact with the second surface; limiting means carried by said friction means in peripheral engagement therewith; and spring means disposed between said limiting means and said second opposed surface, said friction means being urged toward said first opposed surface to maintain a preset clearance between the first and second opposed surfaces.

3. A device for maintaining a preset clearance between a brake shoe and a brake drum, said device comprising: pin means including a mounting bracket carried by the brake shoe, said pin having a frictional element integral therewith arranged to contact the brake drum; retaining means carried by said pin means; and biasing means interposed between said retaining means and said bracket for urging said pin means against the brake drum, said biasing means arranged to reposition the brake shoe after a brake actuation a predetermined distance away from the brake drum.

4. A device for maintaining a preset clearance between a brake shoe and a brake drum, said device comprising: a metallic pin having a friction resistant head arranged to maintain contact with the brake drum, said pin being slidably carried in a portion of the brake shoe; a bracket mounted on the brake shoe and arranged to guide said pin in its slidable mounting on the brake shoe; retaining means carried by said pin and arranged to limit sliding movement of said pin; and biasing means interposed between said retaining means and said bracket to limit the sliding movement of said pin after a brake actuation to position the brake shoe a predetermined distance from the brake drum.

5. A device according to claim 4 wherein the friction resistant head of said pin is composed of a powdered metal material.

6. A device according to claim 4 wherein the retaining means is a sleeve ring frictionally engaging the periphery of said pin, said sleeve ring being movable to new peripheral positions on said pin as the brake lining wear progresses.

References Cited
UNITED STATES PATENTS 3,068,965  12/1962  Mossey _____ 188—79.5

FOREIGN PATENTS 762,891  9/1953  Germany.

DUANE A. REGER, *Primary Examiner.*